United States Patent [19]

Switlik

[11] Patent Number: 5,219,203
[45] Date of Patent: Jun. 15, 1993

[54] AIRPLANE SAFETY SEAT FOR LAP CHILDREN

[76] Inventor: Stanley Switlik, 33 E. Welling Ave., Pennington, N.J. 08534

[21] Appl. No.: 831,880

[22] Filed: Feb. 5, 1992

Related U.S. Application Data

[63] Continuation of Ser. No. 536,519, Jun. 12, 1990, Pat. No. 5,143,420.

[51] Int. Cl.5 ............................................. A47C 1/08
[52] U.S. Cl. .................................... 297/250; 297/488
[58] Field of Search ........................ 297/250, 487, 488

[56] References Cited

U.S. PATENT DOCUMENTS

| | | | |
|---|---|---|---|
| 2,308,315 | 1/1943 | Smith | 297/250 |
| 4,076,307 | 2/1978 | Nanba et al. | 297/250 |
| 4,376,551 | 3/1983 | Cone | 297/250 |
| 4,738,489 | 4/1988 | Wise et al. | 297/250 X |

FOREIGN PATENT DOCUMENTS

| | | | |
|---|---|---|---|
| 0003850 | 9/1979 | European Pat. Off. | 297/250 |
| 3643587 | 7/1987 | Fed. Rep. of Germany | 297/250 |
| 0004549 | 1/1989 | Japan | 297/250 |
| 2095543 | 10/1982 | United Kingdom | 297/250 |
| 0001778 | 3/1986 | World Int. Prop. O. | 297/250 |

Primary Examiner—José V. Chen

Attorney, Agent, or Firm—Mathews, Woodbridge & Collins

[57] ABSTRACT

A safety seat including a crash resistent barrier to protect a small child on the lap of an adult in the even of an airplane crash. A frame including a back and a pair of sidewalls receives the bucket seat that holds the child. The frame is formed from a continuous piece of aircraft tubing bent in such a way as to form an outer oval portion and a V-shaped inner portion that provides springy resilience to the frame. A two-part crash barrier is positionable over the front of the child so that the force of an adult lurching forward will not crush the child. Seat belt receiving hooks keep the safety seat and the child securely in place on the lap of the passenger. A pair of U-shaped inflatable rings attachable around the frame keep the seat floating in an upright position if the airplane ditches over water. The two-part crash resistent barrier can be folded backwardly and locked in position so that the seat will assume one of two given angles if it is desired to use the device in an automobile. At one angle the seat faces rearwardly for infants and at the other angle the seat faces frontward for older children. A convertible cart can be attached to the seat so that a parent can wheel the child through an airport. The handle of the cart may be turned downwardly so that the cart can also be used as a backpack.

4 Claims, 8 Drawing Sheets

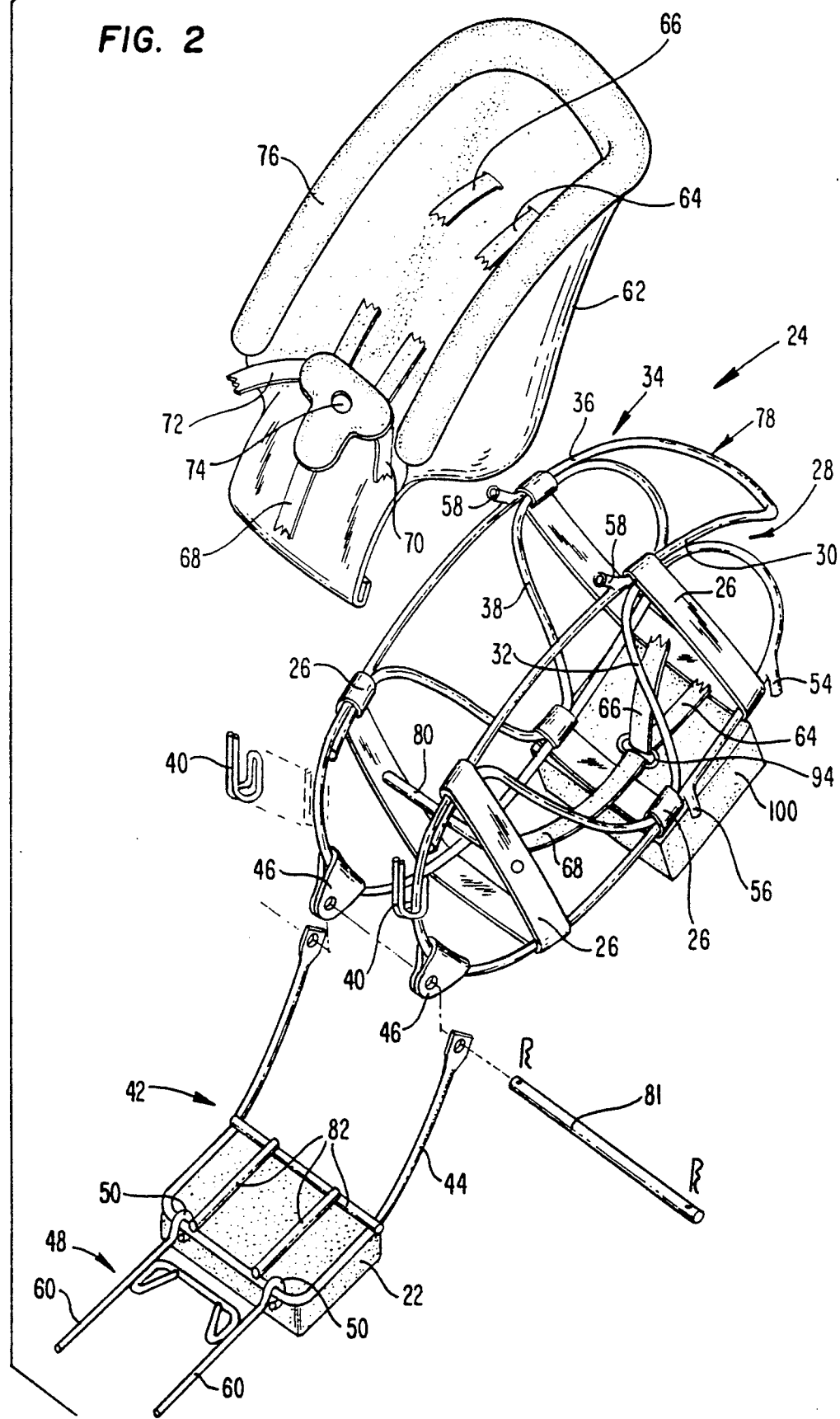

AIRPLANE SAFETY SEAT FOR LAP CHILDREN

This application is a continuation of application Ser. No. 536,519, filed Jun. 12, 1990, now U.S. Pat. No. 5,143,420.

BACKGROUND OF THE INVENTION

1. Field of the Invention

The invention relates to a crash-proof child safety seat that can be used on the lap of an adult on an airplane or in an automobile.

2. Description of Related Art

The problem of carrying infants and small children on airplanes has only recently begun to receive the attention it deserves. An excellent discussion of the background of the problem and the state of the art can be found in a paper entitled "The Status of Infant/Child Restraint Protection in Aircraft Crash Impacts" by Richard G. Snyder, Ph.D., presented as part of the Proceedings of the International Aircraft Occupant Safety Conference and Workshop, Flight Safety Foundation, Arlington, Va., Oct. 31–Nov. 3, 1988, Final Report DOT/FAA/OV-89-2 Aug. 1989. The dilemma is that airlines will frequently require that a small child sit on a parent's lap or that the parent purchase a second seat. The purchase of a second seat for an infant or small child is an expensive proposition for most families. Alternatively, having an unrestrained infant sit on a parent's lap is also undesirable for at least two reasons. First of all, the child, often referred to as a "lap child", is unrestrained, and, therefore, in the event of a crash the child might leave the parent's lap and strike an object in the cabin. Second, and more importantly, the weight of an adult in the event of a crash or sudden stop would be brought to bear directly on top of the child thereby crushing the child and producing severe trauma. This problem has been the subject of several recent articles including one entitled "Child Safety Seats: Debate on Recalls" including a sub-article entitled "Taking Baby on a Plane" which appeared in the Saturday, Feb. 24, 1990 edition of The New York Times, page 16Y. Moreover, two editorials and additional supporting stories appeared in the Mar. 1, 1990 edition of U.S.A. Today, page 10A. The first editorial was entitled "Don't Require Seats for our Littlest Fliers" and the second is entitled "Require Seats for our Littlest Fliers". Both sets of articles point up the difficulty of carrying lap children on commercial airliners versus the economic factor of purchasing an extra seat and using that with a standard automotive seat.

If the commercial airlines require adults to purchase extra tickets for their infant children, then many of those infants will end up travelling by automobile due to the extra cost. That in turn will mean a larger number of infant fatalities due to the relatively greater danger of travelling by automobile as compared to travelling by commercial aircraft. An editorial entitled "Don't Require Seats for Tots Who Fly" which appeared in the May 24, 1990 edition of USA Today, page 12A, summarized the problem as follows: ". . . it could force them (parents) to take the trip by car. That could be more dangerous."

There is a clear need for a practical lap usable safety seat. This need is described in a number of recent newspaper stories including: an article entitled "Airline Infant Safety Seats Required" that appeared on page 17 of the Feb. 5, 1990 edition of Aviation Week & Space Technology; an article entitled "NTSB Recommends FAA Require Child Safety Seats on Aircraft" which appeared on page 117 of the May 28, 1990 edition of Aviation Week & Space Technology; and, an article entitled "Airplane Safety Seats are Urged for Children" that appeared on page A8 of the May 23, 1990 edition of the Wall Street Journal. The need for airline safety seats was nicely summarized in an article entitled "Airlines Now Push Baby Safety Seats" which appeared on pages B1 and B8 of the Feb. 22, 1990 edition of the Wall Street Journal. That article stated in its conclusion as follows: "Any rule requiring safety seats could easily take a year or so to go into effect. In the meantime, the airlines want the FAA to redouble research efforts into developing some sort of contraption that would restrain babies without requiring an extra plane seat. If such an apparatus were invented, they say, safety seats—and extra tickets —wouldn't be needed." In short, there is a clear need to provide a crash resistant carrier that will permit an adult to keep a child on his or her lap. From the economic point of view, it would save parents money and would mean that the airlines would not lose revenue from those parents who couldn't afford the extra ticket. From the safety point of view, it is safer to travel by commercial airliner than it is to travel by car and, therefore, it is desirable to encouraged parents to take their children on airplanes. Lastly, there is a clear need for an appropriate lap child safety seat as set forth in the foregoing articles describing the current positions of the National Transportation Safety Board (NTSB) and The Federal Aviation Administration (FAA).

There does not appear to be a large body of prior art related to the problem of the lap child on an airline. U.S. Pat. No. 4,618,186 entitled CHILD SAFETY RESTRAINT does, however, describe a child restraint in the form of a strap that can be used by a parent to hold a child on the lap in an airplane environment. If the adult is thrown forward, however, he or she is likely to crush the child. Moreover the restraint does not provide protection from objects that might become airborne during an accident.

U.S. Pat. No. 4,900,086 entitled INTEGRAL FOLDING CHILD RESTRAINT SYSTEM describes a safety seat that can be used both on a land vehicle or in an aircraft. Unfortunately the structure of that child restraint system is not such as would lend itself to use on the lap of an adult.

The prior art does disclose some bracket-like elements that can rotate with respect to a child's seat. Note, for example, U.S. Pat. No. 4,456,302 in which a barrier is rotatable from a rear position to a front position. Belgian Patent No. 61,939 discloses a stroller/safety seat in which the rear stroller frame mechanism can be rotated around the front to form a carrying handle. U.S. Pat. No. 3,645,548 describes a rear frame member which can be rotated from behind to in front. Similarly, U.S. Pat. No. 3,400,976 discloses another child safety seat in which a member is rotatable from a rear position to a front position. In summary, the concept of a rotatable bracket-like element in the context of a child seat is known in some environments. However, one that provides safety protection from an adult who might crush a lap child during an airplane accident or reconverts the unit for automotive seat use, does not appear to be taught or suggested.

Convertible strollers and backpacks are known in certain limited areas For example, U.S. Pat. No. 3,659,865 discloses a SAFETY SEAT FOR CHIL- DREN which is carriable in a variety of different modes. In one mode, the safety seat can be carried with an arm sling by an adult. The carrier can also be part of a back pack that is attached to the adult or, alternatively, the seat can be used as part of a stroller. Similarly, U.S. Pat. No. 4,113,306 entitled CONVERTIBLE CHILD RESTRAINT discloses a child carrier which is convertible into a stroller. U.S. Pat. No. 4,743,063 discloses another CONVERTIBLE MULTIFUNCTION CHILD RESTRAINT SYSTEM in which the seat can be positioned facing forwardly or rearwardly or might be attached to a highchair/stroller apparatus. However, insofar as understood, none of the prior art appears to describe or suggest a convertible hand cart/backpack which would be appropriate and useful for a child safety seat of the sort that would protect a lap child.

Flotation devices are known in aircraft. For example, the cushions in many airplanes float and it is common practice to require inflatable life preservers on international flights that pass over water. If an infant is travelling in the seat next to his or her parent, it can be difficult to put a life preserver on the child. First the parent has to put on his or her own life preserver. Then the infant must be removed from its seat and a separate life preserver placed on the child. This procedure could take more time than an emergency situation permits. It would, therefore, be useful to have a lap child safety seat in which the flotation is permanently attached and does not have to be separately worn and specially manipulated. Some flotation devices are directed toward child safety. Note for example, U.S. Pat. No. 4,687,452 entitled GAS-INFLATABLE, FLOATING, PORTABLE SEAT. There does not appear, however, to be any significant body of prior art related to the emergency flotation of a child safety seat such as employed to protect a lap child and wherein both the seat and the flotation meet FAA/TSO requirements.

With regard to the frames in general, note U.S. Pat. No. 4,790,593.

The following patents are cited as being of general interest only: 4,852,894; 4,231,613; 4,204,695 and French Patent No. 2602-409-A.

While certain elements of the present invention may be known in different contexts, there does not appear to be any suggestion of a crash worthy lap child safety seat that would prevent a child from being crushed by an adult in the event of an airplane accident. Moreover, there do not appear to be any specific suggestions or teachings of flotation devices or convertible hand carts/backpacks that would appropriate for use with a lap child safety seat. It was in the context of the foregoing prior art that the present invention arose.

SUMMARY OF THE INVENTION

Briefly described, the invention comprises a lap child safety seat for protecting an infant in the event of an airplane crash. The infant is strapped into a bucket seat that nestles in a three-sided frame. The frame includes a back, a first sidewall and a second sidewall. Each sidewall is formed from a continuous piece of tubing which first forms an outer oval rim and then an inner "V" shaped portion to provide resilience to the outer oval rim. The continuous piece of tubing forms a bridge which connects the two sidewalls to each other. A movable crash protector is pivotally attached to the frame and comprises three parts: a first section pivotally attached to the frame; a crash pad supported by the first section; and, a second section pivotally attached to the first section including legs adapted to be received in sockets in the frame. Hooks at the base of the frame allow the seat belt of the airline passenger or automobile passenger to be attached to the child safety seat in the lap or rear facing modes.

The crash protector can assume one of two positions when the safety seat is used on airplanes. In a first position, the pad is folded over so that it is substantially flush with the oval rim of the two sidewalls. In this mode, the child is completely encircled by tubing and padding so that if an adult is thrown forward, he or she will not crush the child. In a second position, the legs of the crash protector fit into sockets on the front of the frame so that the crash pad is slightly raised thereby giving the child some additional freedom and space.

The child safety seat can also be used in one of two different positions in an automobile or in the seat next to the parent in case of larger children in which case the crash protector is folded rearwardly and the legs are received in one of two sets of rear sockets. When the legs are placed in the higher set of sockets, the frame is inclined more towards the horizontal. In this mode, the safety seat is attached to the seat belt by the hooks so that the infant travels facing backward in the manner that is becoming more and more common. If the legs are placed in the second lower set of rear sockets, thereby raising the back somewhat with respect to the horizontal, the child can face forward. In this mode the safety belt passes through the gaps in the side frames. This second position is more suitable for older, larger children.

In the event that the airplane crashes in water, the child safety seat is equipped with a pair of U-shaped inflatable rings. The U-shaped rings stored on the seat frame when not in use are attached slightly above the center of gravity of the frame so that when the child is in the water, he or she will float in an upright position thereby being able to breath. It is likely that upcoming regulations will require a life vest under every seat. This reflects the growing government concern for the safety of airline passengers who may crash over water. While most domestic flights are predominately over land, it should be remembered that many of the major takeoff and destination airports such as Kennedy in New York and Logan in Boston, etc., are located directly over bodies of water and the vast bulk of airline crashes take place on takeoff or landing. The flotation provided by the present invention conforms to the TSO-C13 standards for infant flotation devices thereby eliminating the need to carry an extra inflatable life vest. According to the preferred embodiment of the invention, the adult merely has to pull a cord which causes the U-shaped flotation rings to surround the child.

Child safety seats can be somewhat bulky and awkward. This is a major problem for children who go on airplanes because the parent frequently must run between two distantly located terminals while carrying luggage. To solve this problem the lap child safety seat can also be provided with a convertible hand cart/backpack. The cart includes a handle which in the upright position permits the child safety seat to be pushed or pulled along on a set of wheels. A pair of rotatable rods are employed to support the child safety seat in the cart mode. Alternatively, with the handle folded down and a simple harness/strap attachment, the child can be carried on the back of the adult with the hand cart acting as the frame of the backpack.

These and other features of the invention will be fully understood by referring to the following drawings.

BRIEF DESCRIPTION OF THE DRAWINGS

FIG. 2 is an exploded perspective view of the preferred embodiment of the invention.

DETAILED DESCRIPTION OF THE INVENTION

During the course of this description, like numbers will be used to identify like elements according to different views that illustrate the invention.

Figure 1:
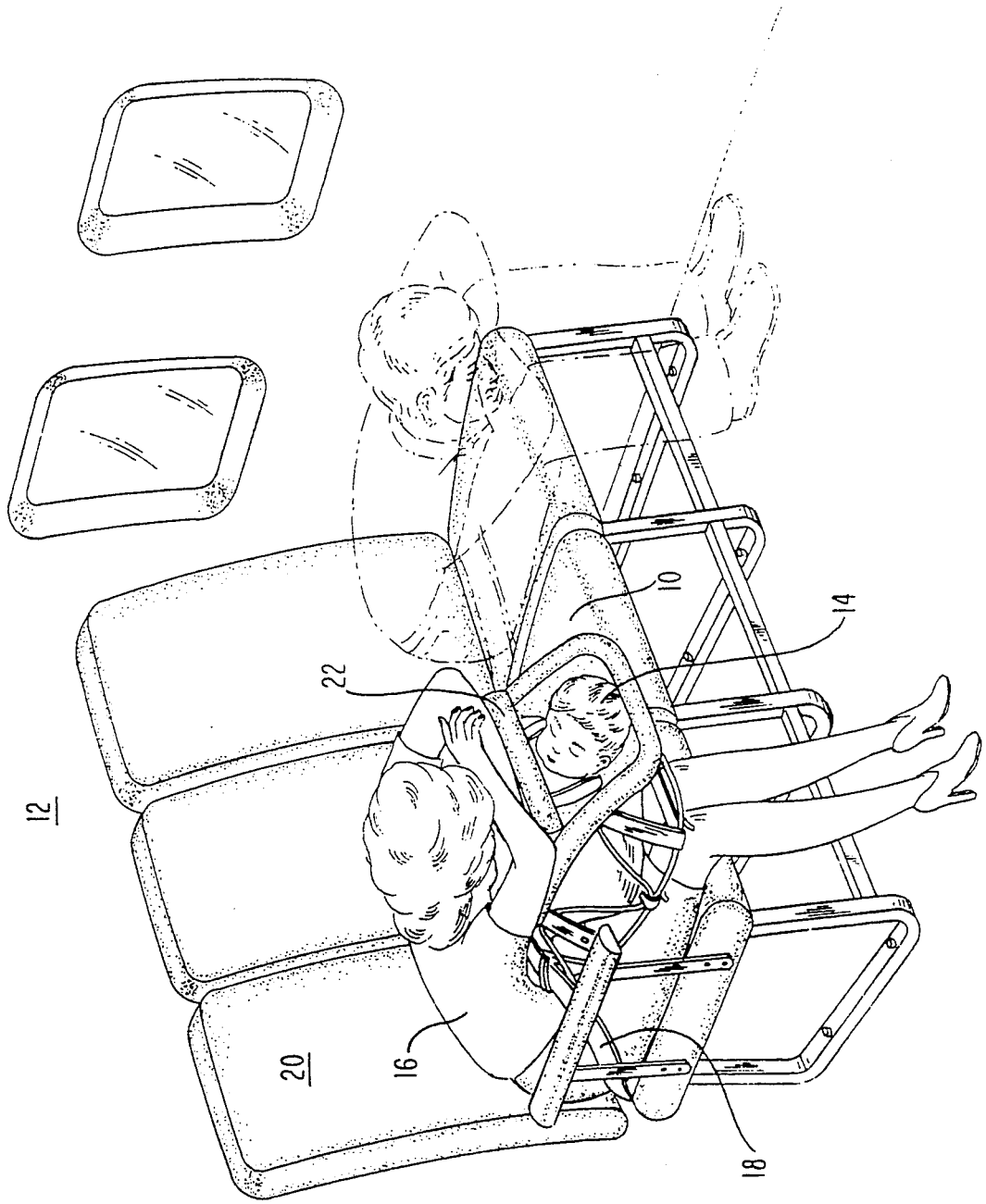
FIG. 1 is a perspective view of the lap child safety seat according to the present invention shown in the context of an airplane in which passengers are braced for a crash.

The lap child safety seat invention 10 is illustrated in FIG. 1 in the context of a conventional airplane 12. An infant or small child 14 is held on the lap of his parent 16 by a seat belt 18. The parent 16 sits in a conventional airline seat 20 and is shown in the precrash position. A crash pad 22 protects the child 14 from the weight of the parent 16 and debris that might become airborne in the event of an airline catastrophe and protects the parent from impacting the infant seat. The greatest danger faced by a child 14 during airplane impact is the great force of the adult 16 thrown against it in the event that the child 14 is sitting on the adult's lap.

FIG. 2 is an exploded perspective view of the major elements that comprise the preferred embodiment of the present invention 10. The frame 24 is crucial to the present invention and forms a safety "cocoon" or "egg" around the infant. The frame 24 comprises at least three broad metal straps 26 across its back and a first and second side frame 28 and 34. Each side frame or sidewall 28 and 34 is preferably formed from a single bent piece of aluminum aircraft tubing or rod connected together at the top by a bridge section 78. Aluminum aircraft tubing is preferred because it is lightweight, strong and resilient. The first sidewall 28 includes an outer oval rim 30 and a V-shaped inner center section 32 that provides resilience and support to the outer oval rim 30. Similarly, the second sidewall 34 includes an outer oval rim 36 and a V-shaped inner center section 38. The upper and lower metal back straps 26 extend around the sides of sidewalls 28 and 34 to provide additional support. The strap 26 in the middle is located across the deep portion of the V interior sections 32 and 38.

Figure 3A:
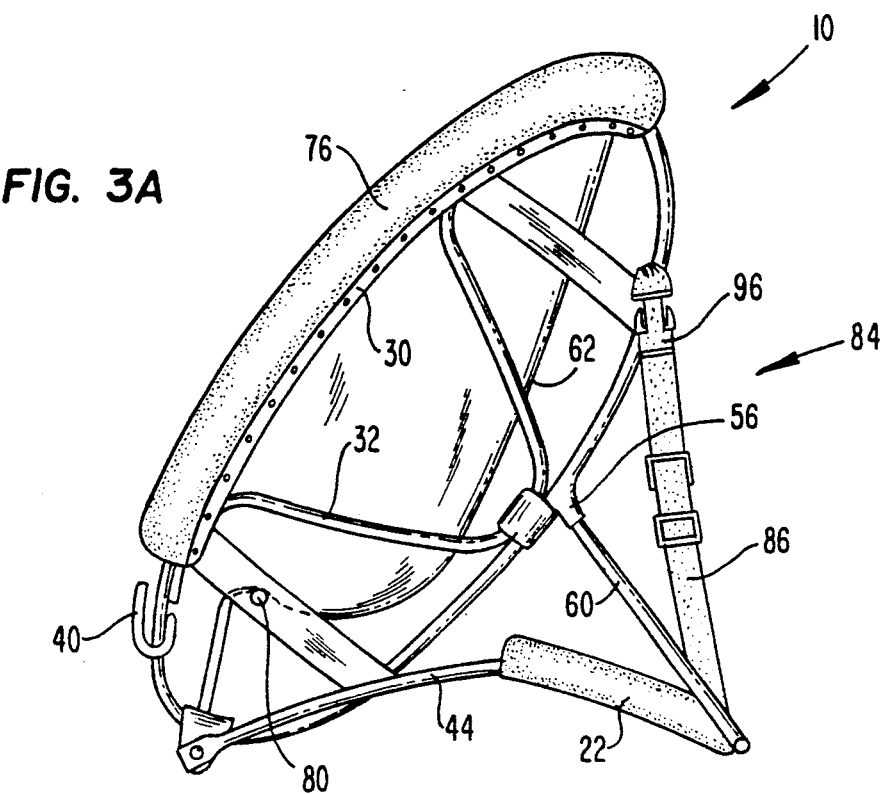
FIG. 3A is a right side elevational view of the invention shown in the mode in which it might be employed for carrying a small child, facing forward in an automobile or on a hand cart.
Figure 3B:
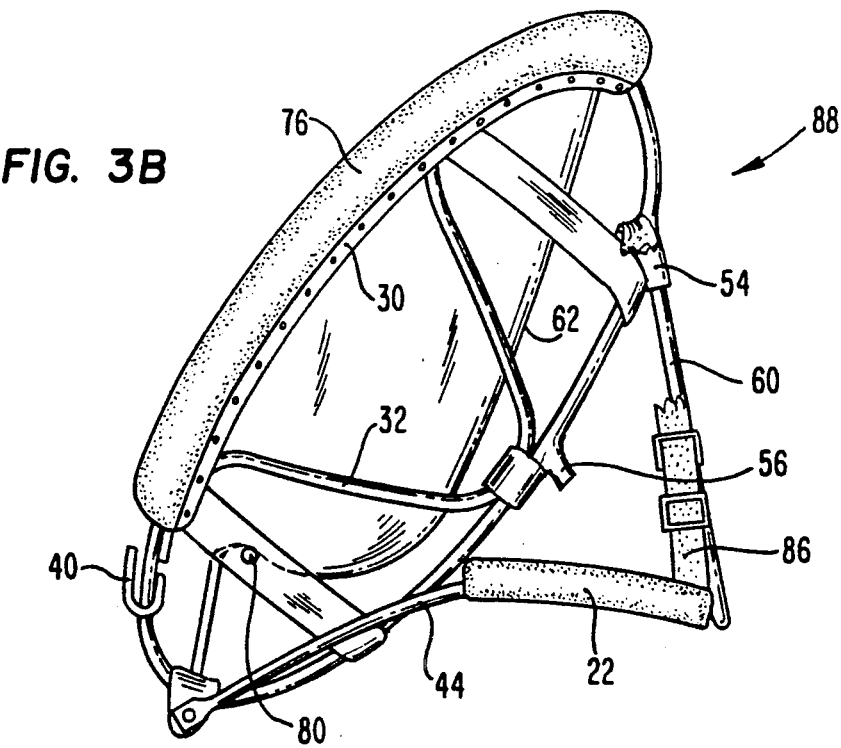
FIG. 3B a right side elevational view of the preferred embodiment of the invention showing the child safety seat in a lower mode suitable carrying an infant, facing rearwardly in an automobile.
Figure 3C:
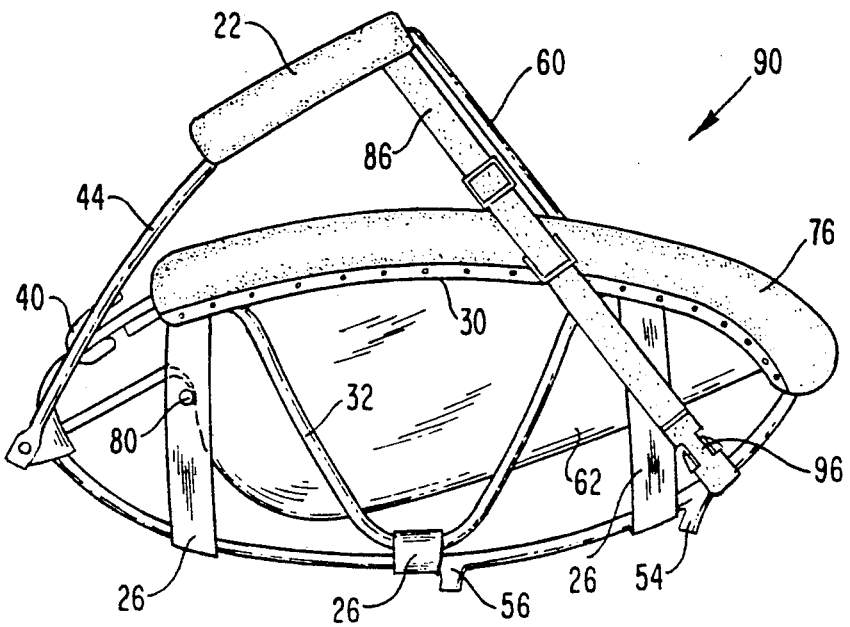
FIG. 3C is a right side elevational view of the present invention showing the crash pad in its elevated position as it might be employed in a backpack.
Figure 3D:
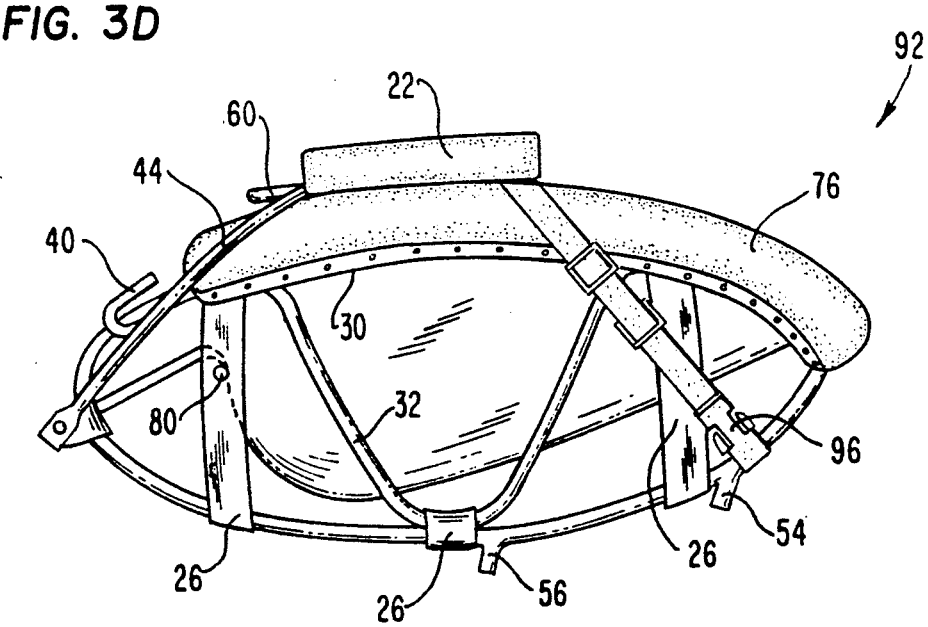
FIG. 3D is a right side elevational view of the invention showing the crash pad in its lower position as might be used by a parent in anticipation of a crash.
Figure 3E:
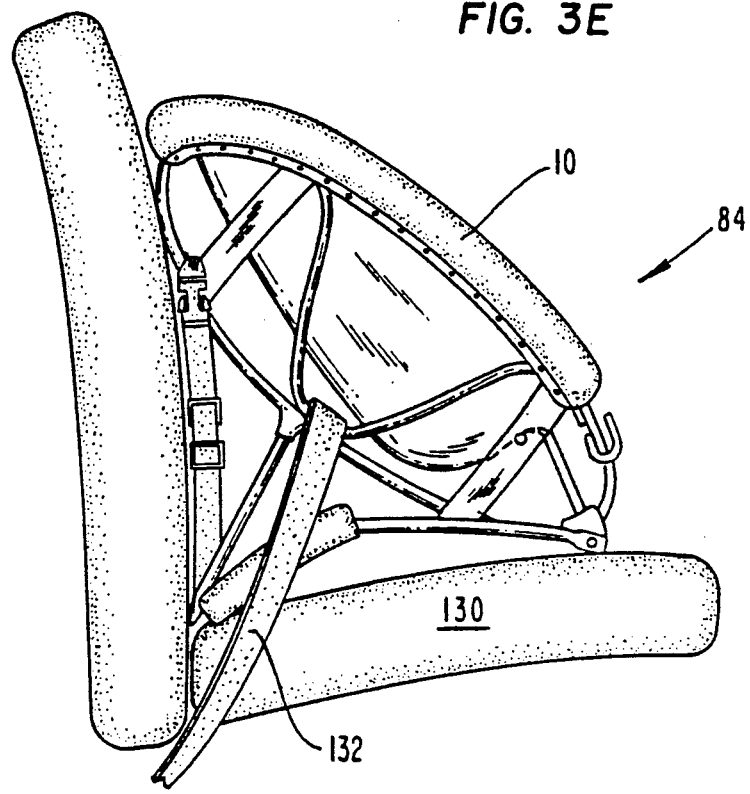
FIG. 3E illustrates the present invention in a mode similar to that shown in FIG. 3A wherein a small child is restrained by an automobile safety belt and is facing in the forward position.
Figure 3F:
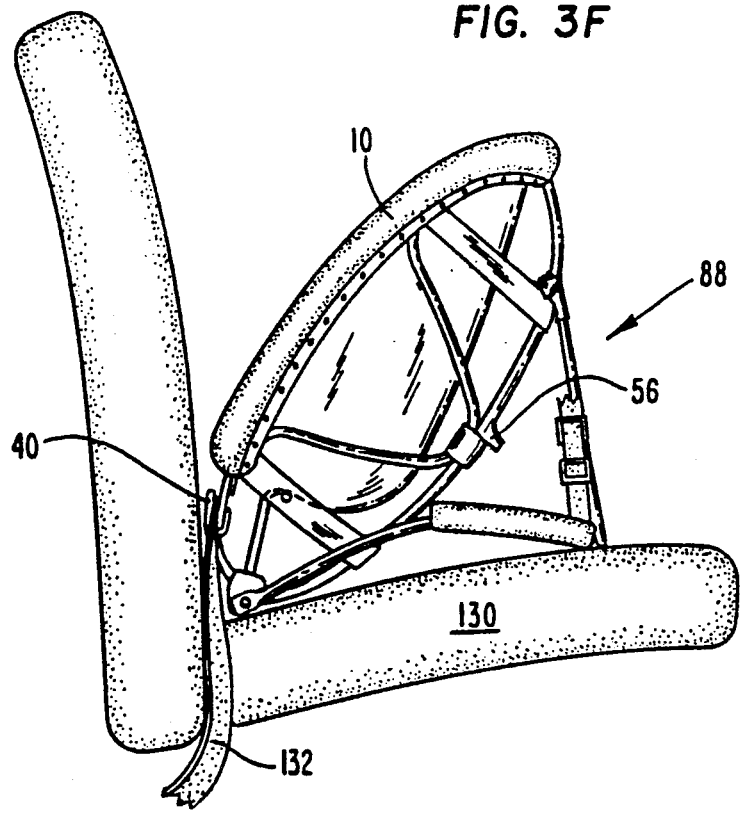
FIG. 3F illustrates the present invention in a mode similar to that shown in FIG. 3B in which an infant is secured by a safety belt to an automobile seat and facing in the rear position.

A pair of seat belt hooks 40 are attached to the lower section of sidewall frames 28 and 34 and are adapted to receive an airline seat belt 18 or an automobile seat belt 132 as shown in FIGS. 1 and 3F, respectively.

A two part child crash protector 42 includes a first square-shaped section 44 and a second U-shaped section 48 including a pair of legs 60 thereon. The first square-shaped section 44 is connected by hinges 46 and bar 81 to frame 24 which permits section 44 to rotate with respect to the frame 24. Another set of hinges 50 connect the second U-shaped section 48 to the first square-shaped section 44 and permits the second section 48 to rotate with respect to the first section 44. The crash pad 22 is supported by three struts 82 attached to the portion of the first section 44 furthest from the pivot hinges 46 and bar 81. The free ends of both legs 60 are receivable in socket pairs 54, 56 and 58. The first and second set of socket pairs 54 and 56 are located on the back of frame 24. The third set of socket pairs 58 is located on the front of the sidewalls 28 and 34 of frame 24.

A molded bucket seat 62 is receivable within the frame 24 in such a way that the oval rims 30 and 36 of the sidewalls 28 and 34 effectively surround and protect the bucket seat 62 and its occupant 14. The small child or infant 14 is held in bucket seat 62 by a left shoulder strap 64, a right shoulder strap 66, a crotch strap 68, a left waist strap 70, a right waist strap 72 and a five point padded buckle 74. Shoulder straps 64 and 66 and waist straps 70 and 72 include tabs which are insertable and securable in buckle 74. The straps 64, 66, 70 and 72 can be easily released from buckle 74 which preferably comprises part of a padded chest protector. Crotch strap 68 continues through the bucket seat 62 around the backside and over leg rod or anchor 80 onto the point where it reaches a D-ring 94. The left and right shoulder straps 64 and 66 respectively pass from the D-ring 94 and through the back side of the bucket seat 62 and over the shoulders of the child or baby 14 and attach to the buckle 74 on the padded chest protector. A padded U-shaped rim 76 provides a cushion around the outer exposed edge of the bucket seat 62.

According to another embodiment of the invention, a pair U-shaped inflatable rings 100 are also provided to give the safety seat 10 flotation capabilities. The flotation rings 100 are shown in the deflated mode and stored behind the bucket seat 62 when not in use. That feature will be discussed in greater detail with respect to FIGS. 4A through 4C.

The child safety seat and the crash protector 42 are capable of assuming any one of four different positions 84, 88, 90 and 92 as shown respectively in FIGS. 3A, 3B, 3C and 3D.

In position 84 shown in FIG. 3A, the legs 60 are received in the second pair of leg receiving sockets 56. An adjustable backstrap 86 is employed to hold the legs 60 firmly in sockets 56. A standard snap release 96 permits the strap 86 to be attached or disengaged. The first position 84 is especially suited for use with an older, larger child. FIG. 3E shows the child safety seat facing forward, relative to the direction of travel, in the first position 84. The seat 10 sits on an automobile seat 130 and is held in place by the automobile lap belt 132 which passes through the deepest part of the V. Position 84 is the one that would be most likely to be used for an older, larger child when that child travels in an automobile. The same position 84 might also be used when the same older, larger child travels in the seat adjacent its parent on an airplane.

The second position 88 shown in FIG. 3B would be employed for use with an infant smaller than a child who might ride in position 84 shown in FIG. 3A. In the second position 88 the legs 60 are received in the upper pair of leg receiving sockets 54. The strap 86 is attached in the same manner as it is with regard to the first position 84 holding the legs 60 firmly in their respective sockets 54. A seat 10 illustrated in the second position 88 is shown in FIG. 3F. The seat 10 faces backwards, relative to the direction of travel, and is held in position by the safety belt 132 which passes through the safety belt hooks 40. This is the preferred mode when the seat 10 is positioned on an automobile seat 130 and where the occupant is an infant. This mode or position 88 could also be used if an extra seat is available next to a parent on an airplane.

Figure 5A:
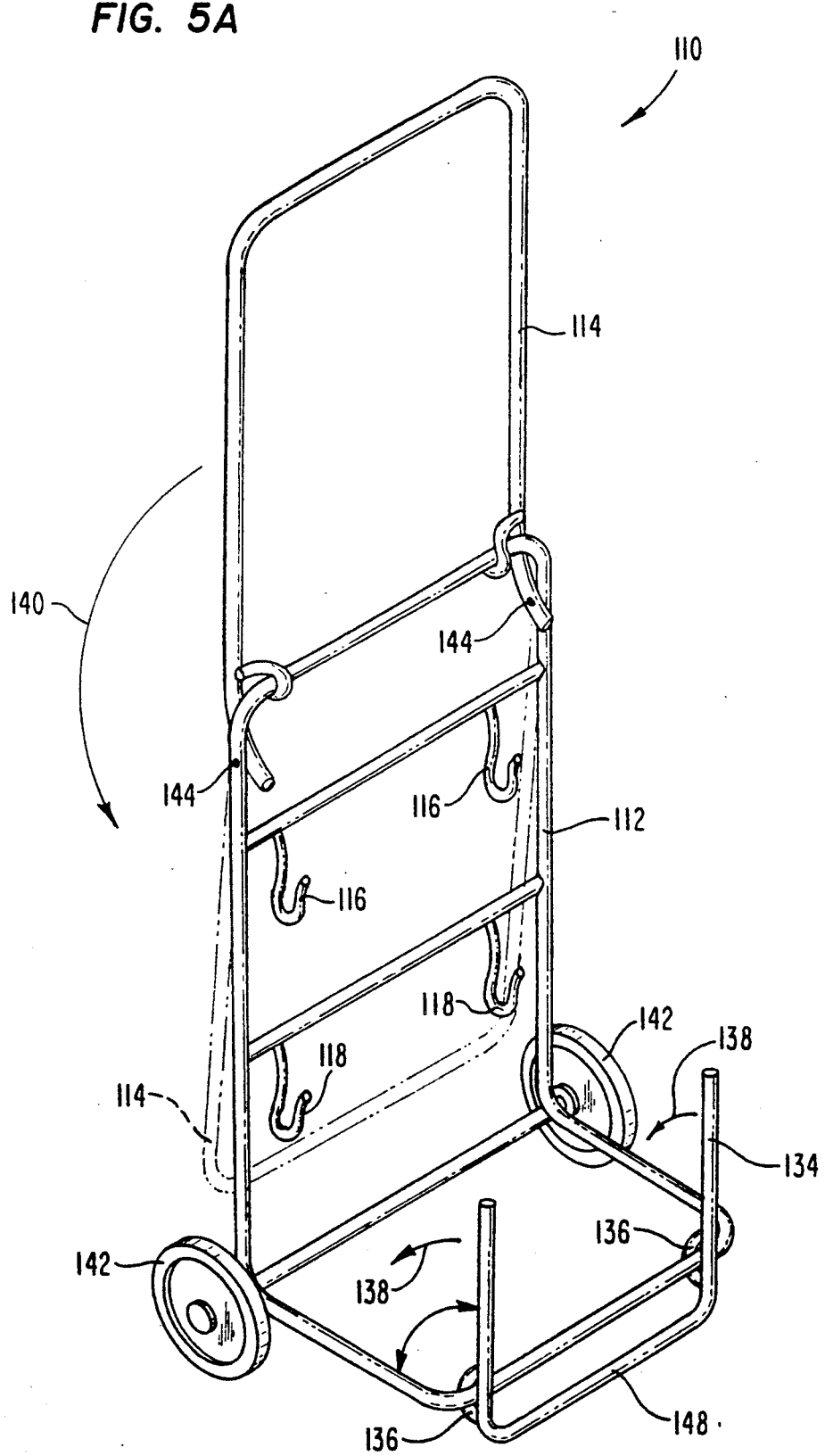
FIG. 5A illustrates another embodiment of the invention comprising a convertible hand cart/backpack device especially suitable for use is lap child safety seat invention.
Figure 5B:
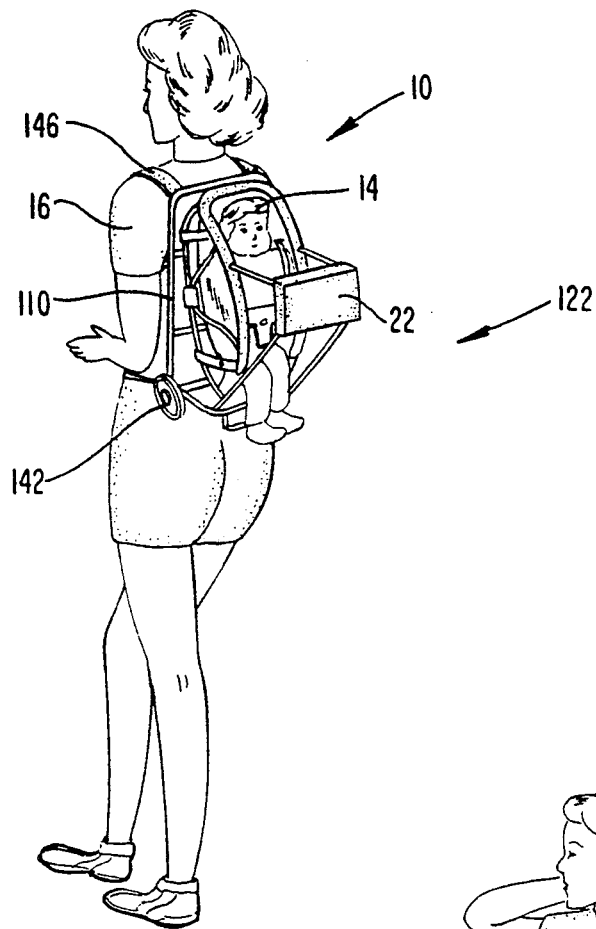
FIG. 5B illustrates the convertible hand cart/backpack embodiment employed a back pack.

The third position 90 illustrated in FIG. 3C might be used when the child 14 is carried in a backpack as shown in FIG. 5B. In the third position 90, the legs 60 are received in the third set of leg receiving sockets 58 located on the upper portion of the oval sections 30 and 36 diagonally across from the first set of receiving sockets 54 on the back of the frame 24. Strap 86 encircles the frame so as to hold the legs 60 firmly in their receiving sockets 58. The third position 90 gives the child 14 additional room while still providing some protection from the exterior.

The fourth and final position 92 is illustrated in FIG. 3D. This is the airplane lap usable crash mode where the legs 60 are folded flat back and are not received in sockets 54, 56 or 58. The crash pad 22 incorporated in protector 42 is held in position by adjustable strap 86 which passes around the back of frame 24 and is attached by snap buckle 96. FIG. 1 shows the apparatus 10 in the lap usable crash mode 92. When the crash protector 42 is in crash mode 92, the crash pad 22 prevents an adult from lurching forward and accidentally crushing the baby 14. The crash protector 42 also protects the adult from impact injury if the adult strikes the carrier 10 without adequate preparation. The sidewalls 28 and 34 in conjunction with the reinforced bucket seat 62 and the crash pad 22 form an egg-shaped environment that completely protects the child 14 from harm. Moreover, the lap belt 18 which passes through the hooks 40 prevents the child safety seat 10 from leaving the relative protection of its parent's lap.

Figure 4A:
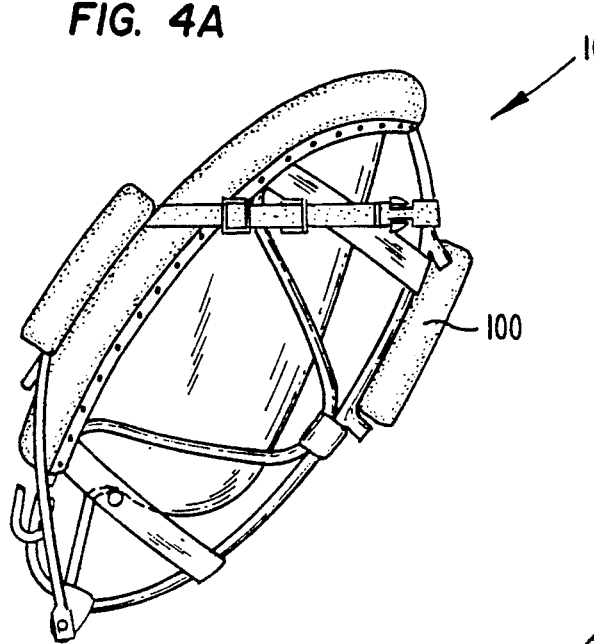
FIGS. 4A through 4C illustrate an embodiment of the invention in which two U-shaped inflatable flotation devices are employed to keep a child afloat in a heads-up state in the event that the airplane crashes at sea.
Figure 4B:
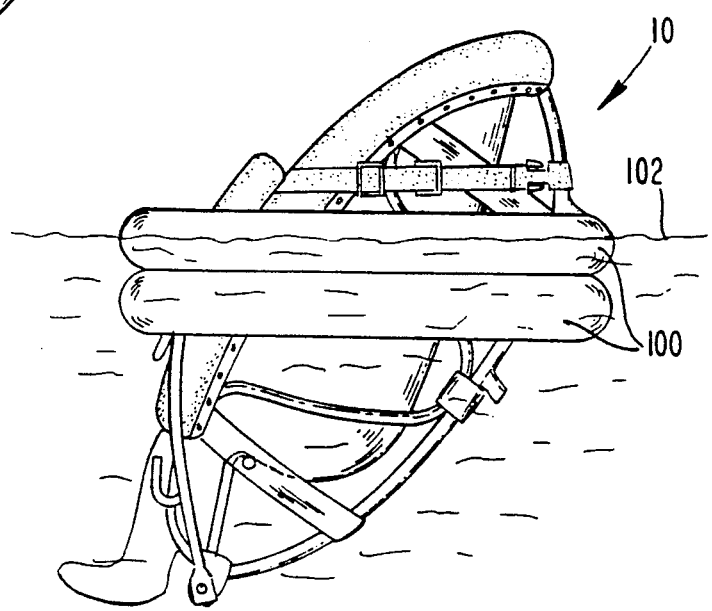
Figure 4C:
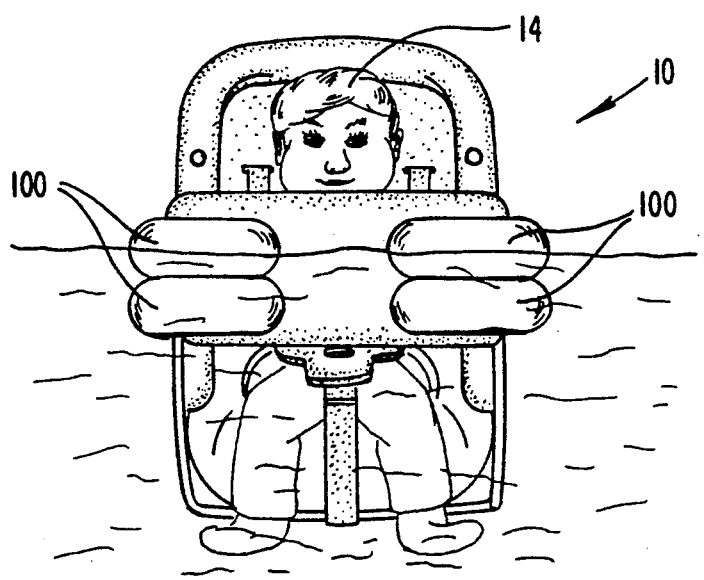

Generally, international flights over water require flotation that meets specific FAA/TSO regulations. Therefore, according to an alternative embodiment of the invention, a flotation package 100 can be stowed within the frame 24 behind bucket seat 62 and between the bottom part of the V-shaped portion and the upper aluminum band 26. The flotation 100 may also be stored directly behind the frame 24 as shown in FIG. 4A. In case of an accident, the flotation 100 can be inflated as shown in FIGS. 4B and 4C. The child 14 need not be removed from the seat 10 to attach a separate ILV (Infant Life Vest). Inflatable flotation 100 is always attached to seat 10 and inflated by adult 16 only when necessary. The flotation 100 may be inflated by a conventional $CO_2$ cartridge or by mouth. When inflated, the flotation means 100 comprises two U-shaped rings. The rings are attached to the seat frame 24 in such a way as to be above the center of gravity of the seat but below the location where the child's head might be located. In this way the child safety seat will always float upright in a body of water 102 so that the child 14 can breathe.

Because the child safety seat 10 of the present invention is designed for lap children 14, it is anticipated that it will be necessary to carry the child 14 and the safety seat 10 through airports or on relatively long walks. Sometimes it will be possible to wheel the child and on other occasions it may be necessary to carry the child in a backpack mode. Therefore, according to another embodiment of the invention, a convertible child cart-/backpack 110 will allow a parent 16 to carry the child 14 either on a cart or on a backpack.

Details of the convertible cart/backpack device 110 are illustrated in FIG. 5A. A lower L-shaped portion 112 is connected by pivots 144 to an upper handle section 114. Handle section 114 can be folded downwardly in the direction of arrow 140 in case it is desired to use the device 110 as a backpack. However, if it is desired to use the device 110 as a cart, the handle is used in its upright mode. A pair of wheels 142 at the bottom of the L-shaped section 112 permit the convertible cart/backpack 110 to be pushed or pulled through airports or on sidewalks. The bottom of the L-shaped section 112 includes a foot portion 148 that permits the convertible cart/backpack 110 to stand upright when it is not being pulled or pushed.

Figure 5C:
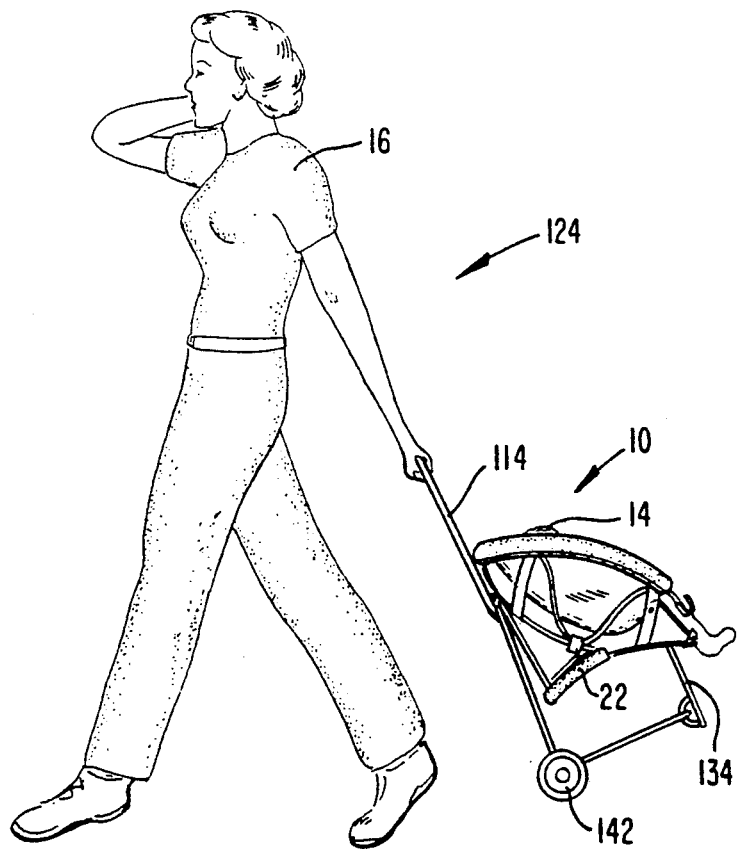
FIG. 5C illustrates the convertible hand cart/backpack embodiment employed as a cart.

An upper pair of hooks 116 and a lower pair of hooks 118 attached to the L-shaped bottom frame 112 are employed to engage two of the cross straps 26 across the back of the seat 10 and hold the seat 10 firmly in position. A pair of pivotable rod supports 134 are used to support the bottom of the seat 10 when the cart 110 is used in the cart mode 124 as shown in FIG. 5C. When the convertible cart/backpack 110 is not being used in the cart mode, the support rods 134 are rotated downwardly on circular hinges 136 in the direction of arrows 138.

The backpack mode 122 is illustrated in FIG. 5B. In this mode, the crash protector 42 is typically in the third position 90 as illustrated in FIG. 3C. The support legs 134 are rotated out of the way on hinges 136 and the entire backpack is attached to the parent 16 by a conventional backpack strap 146 which could include shoulder belts and a waist belt. The handle 114 has been folded downwardly so as to provide reinforcing support to the carrier 110 and to move it out of the way.

The use of the convertible cart/backpack 110 in the cart mode 124 is illustrated in FIG. 5C. In this mode, the handle 114 has been rotated to its maximum upward position. Support legs 134 have been rotated upwardly in the direction of arrows 138 so as to provide support to the bottom of the child safety seat 10. The crash protector 42 and its associated crash pad 22 are also in the third position 90 as shown in FIG. 3C. The carrying straps 146 that were used with in the backpack mode 122 have been stored. The parent 16 is now able to pull or under certain circumstances push the wheeled cart 110 conveniently to any location in an airport or on a street.

Certain modifications of the invention are possible. For example, while the use of tubular aircraft aluminum is preferred for the frame 24, it is possible that other materials such as stainless steel, or plastic might also be appropriate. The bucket seat 62 is preferably formed from a soft material having a hard plastic shell. Other materials are also employable. Similarly, the use of a U-shaped inflatable ring 100 is desirable but it is possible that the ring could be oval, circular or have another shape.

While the invention has been described with reference to the preferred embodiment thereof, it would be appreciated by those of ordinary skill in the art that various modifications can be made to the structure and function of the different parts of the invention without departing from the spirit and scope of the invention as a whole.

I claim:

1. A lap usable child carrier apparatus for use on an airplane by an adult secured by a seatbelt, said apparatus comprising:

a frame having at least a first and second sidewall and a front opening between said first and second sidewalls;

a seat located within said frame between said first and second sidewalls, said first and second sidewalls and said seat defining a space that substantially completely surrounds the upper body of said child on at least three sides when said child is located in said seat;

a crash protection means for preventing said adult from contacting said child in the event of an airplane crash when said crash protection means is in a first crash protection position in which the crash protection means generally forms a front wall covering said front opening;

crash protection padding means attached to said crash protection means for protecting said adult from impact against said crash protection means, said crash protection padding means located generally forward of said frame and having a relatively broad surface and a side such that said broad narrower surface faces said adult when said means is in said first crash protection position; and, rotation means for rotatably connecting said crash protection means to said frame and for permitting said crash protection means to be rotated with respect to said frame from said first position to a second retracted position in which said crash protection means does not cover said front opening, wherein said broad side of said crash protection padding means prevents said adult from impacting against said child when said crash protection means is in said first position and said apparatus is located on the lap of said adult on said airplane.

2. The apparatus of claim 1 wherein said first and second sidewalls have a substantially oval shape.

3. The apparatus of claim 2 wherein said seat comprises a bucket seat.

4. The apparatus of claim 3 wherein said crash protection means rest against said first and second sidewalls of said frame when said crash protection means is in said first position.

* * * * *